(12) United States Patent
Sahara et al.

(10) Patent No.: US 9,703,012 B2
(45) Date of Patent: Jul. 11, 2017

(54) ANTI-GLARE/ANTIREFLECTION MEMBER AND METHOD FOR PRODUCING SAME

(71) Applicant: NIPPON ELECTRIC GLASS CO., LTD., Otsu-shi, Shiga (JP)

(72) Inventors: Keiichi Sahara, Otsu (JP); Takeshi Sakurai, Otsu (JP); Toshimasa Kanai, Otsu (JP); Koji Ikegami, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 15/283,509

(22) Filed: Oct. 3, 2016

(65) Prior Publication Data

US 2017/0023705 A1 Jan. 26, 2017

Related U.S. Application Data

(62) Division of application No. 14/420,679, filed as application No. PCT/JP2013/073000 on Aug. 28, 2013.

(30) Foreign Application Priority Data

Aug. 31, 2012 (JP) .................................. 2012-190855
Dec. 18, 2012 (JP) .................................. 2012-275253

(51) Int. Cl.
*G02B 1/10* (2015.01)
*G02B 1/115* (2015.01)
(Continued)

(52) U.S. Cl.
CPC ................. *G02B 1/115* (2013.01); *B24C 1/06* (2013.01); *B32B 17/064* (2013.01); *G02B 1/11* (2013.01);
(Continued)

(58) Field of Classification Search
CPC ......... G02B 1/111; G02B 1/115; G02B 1/118; G02B 1/11; G02B 1/12; G02B 1/18;
(Continued)

(56) References Cited

U.S. PATENT DOCUMENTS

2008/0192353 A1 8/2008 Nagahama et al.
2009/0086326 A1* 4/2009 Hamamoto ....... G02F 1/133502
359/601
(Continued)

FOREIGN PATENT DOCUMENTS

JP 2007-331996 A 12/2007
TW 200848792 A 12/2008
(Continued)

OTHER PUBLICATIONS

Sahara et al., "Anti-Glare/Antireflection Member and Method for Producing Same", U.S. Appl. No. 14/420,679, filed Feb. 10, 2015.

*Primary Examiner* — James Phan
(74) *Attorney, Agent, or Firm* — Keating and Bennett, LLP

(57) ABSTRACT

Provided is an anti-glare/antireflection member having excellent visibility. The anti-glare/antireflection member (1) includes a base material (10) and an antireflection layer (20). The base material (10) is provided in a surface layer thereof with an anti-glare layer (10*a*) having a concavo-convex configuration. The antireflection layer (20) is provided on the anti-glare layer (10*a*).

15 Claims, 1 Drawing Sheet

(51) Int. Cl.
*G02B 1/11* (2015.01)
*G02B 1/18* (2015.01)
*B24C 1/06* (2006.01)
*G02B 1/111* (2015.01)
*G02B 1/118* (2015.01)
*G02B 1/12* (2006.01)
*B32B 17/06* (2006.01)

(52) U.S. Cl.
CPC .............. *G02B 1/111* (2013.01); *G02B 1/118* (2013.01); *G02B 1/12* (2013.01); *G02B 1/18* (2015.01); *B32B 2307/416* (2013.01)

(58) Field of Classification Search
CPC ... B32B 7/02; B32B 17/064; B32B 2307/416; B24C 1/06
USPC ........................... 359/488.01, 580, 586, 601
See application file for complete search history.

(56) References Cited

U.S. PATENT DOCUMENTS

| | | |
|---|---|---|
| 2009/0290220 A1 | 11/2009 | Nagahama et al. |
| 2010/0232023 A1 | 9/2010 | Nagahama et al. |
| 2015/0198752 A1* | 7/2015 | Lander .................... C03C 15/00 359/601 |

FOREIGN PATENT DOCUMENTS

| | | |
|---|---|---|
| TW | 201044023 A1 | 12/2010 |
| WO | 2008/084604 A1 | 7/2008 |

* cited by examiner

ANTI-GLARE/ANTIREFLECTION MEMBER AND METHOD FOR PRODUCING SAME

TECHNICAL FIELD

The present invention relates to anti-glare/antireflection members and methods for producing the same.

BACKGROUND ART

From the viewpoint of increasing the visibility of a display, there has conventionally been proposed the provision of an antireflection layer or an anti-glare layer on a display surface of the display. For example, Patent Literature 1 describes that an antireflection layer formed of a low-refractive index layer is provided on a base material and the surface of the low-refractive index layer is subjected to an anti-glare treatment to give the antireflection layer both of an antireflection function and an anti-glare function.

CITATION LIST

Patent Literature

Patent Literature 1: JP-A-H10-221506

SUMMARY OF INVENTION

Technical Problem

There is a demand to further increase the visibility of displays.

A principal object of the present invention is to provide an anti-glare/antireflection member having excellent visibility.

Solution to Problem

An anti-glare/antireflection member according to the present invention includes a base material and an antireflection layer. The base material is provided in a surface layer thereof with an anti-glare layer having a concavo-convex configuration. The antireflection layer is provided on the anti-glare layer.

The base material may include a base material body and an island layer disposed on the base material body and forming the anti-glare layer.

The base material body may be formed of a resin film, a glass film, a resin plate or a glass plate.

The anti-glare/antireflection member according to the present invention preferably further includes, on a surface of the base material opposite to the antireflection layer, another antireflection layer.

The antireflection layer may be formed of a low-refractive index layer having a lower refractive index than the base material.

The antireflection layer may be formed of a structure in which low-refractive index layers having a relatively low refractive index and high-refractive index layers having a relatively high refractive index are alternately deposited.

The anti-glare/antireflection member may further include an antifouling layer containing fluorine and provided on the antireflection layer.

A first method for producing an anti-glare/antireflection member according to the present invention pertains to a method for producing the aforementioned anti-glare/antireflection member. A light-transmissive material is applied on a surface of a light-transmissive plate by spraying to form an island layer thereon, thus preparing the base material composed of the light-transmissive plate and the island layer.

A second method for producing an anti-glare/antireflection member according to the present invention pertains to a method for producing the aforementioned anti-glare/antireflection member. A surface of a light-transmissive plate is blasted to form the concavo-convex configuration, thus preparing the base material.

In the second method for producing an anti-glare/antireflection member according to the present invention, the surface of the light-transmissive plate is preferably etched after being blasted.

Advantageous Effects of Invention

In the present invention, an anti-glare/antireflection member having excellent visibility can be provided.

DESCRIPTION OF EMBODIMENTS

Figure 1:
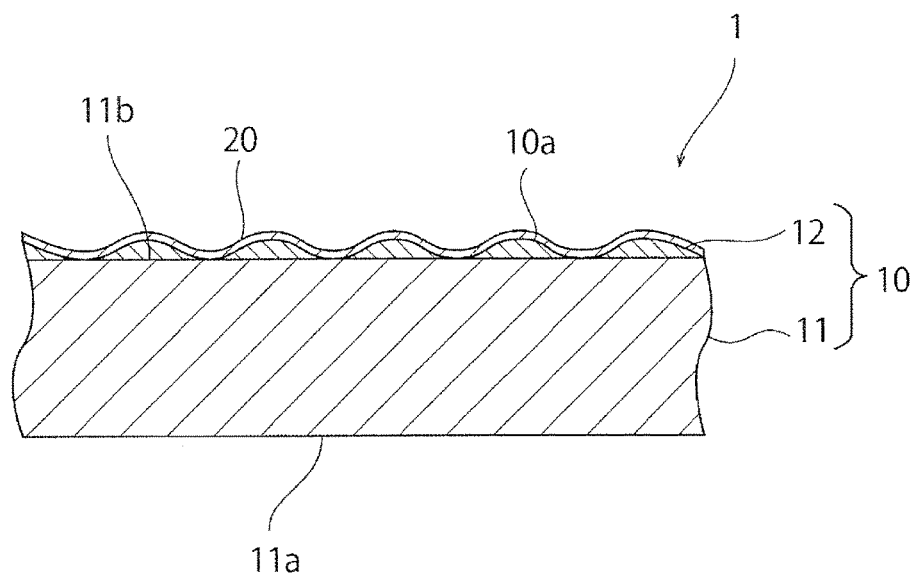
FIG. 1 is a schematic cross-sectional view of an anti-glare/antireflection member according to an embodiment of the present invention.

Hereinafter, a description will be given of examples of preferred embodiments for working of the present invention. However, the following embodiments are simply illustrative. The present invention is not at all limited to the following embodiments.

Throughout the drawings to which the embodiments and the like refer, elements having substantially the same functions will be referred to by the same reference signs. The drawings to which the embodiments and the like refer are schematically illustrated, and the dimensional ratios and the like of objects illustrated in the drawings may be different from those of the actual objects. Different drawings may have different dimensional ratios and the like of the objects. Dimensional ratios and the like of specific objects should be determined in consideration of the following descriptions.

FIG. 1 is a schematic cross-sectional view of an anti-glare/antireflection member according to this embodiment. The anti-glare/antireflection member 1 shown in FIG. 1 is a member disposed, for example, on a display surface of a display and used to improve the visibility of the display. The anti-glare/antireflection member 1 may be a film-like member attached on the display surface of the display or may be a member forming a front sheet of the display. In other words, the anti-glare/antireflection member 1 may be a member attached to the display afterward or may be a component of the display.

The anti-glare/antireflection member 1 includes a base material 10. The base material 10 is provided in a surface layer thereof with an anti-glare layer 10a having a concavo-convex configuration and an anti-glare function. Specifically, in this embodiment, the base material 10 includes a base material body 11 and an island layer 12.

No particular limitation is placed on the constituent material for the base material body 11 so long as it is a material having light permeability. The base material body 11 can be formed of, for example, a resin film, a glass film, a resin plate or a glass plate. The glass plate can be made of, for example, an alkali-free glass substrate, a soda-lime glass substrate, a chemically tempered glass substrate or the like.

The base material body 11 has a first principal surface 11a oriented toward the display in a service condition of the anti-glare/antireflection member 1 and a second principal surface 11b oriented toward the observer in the same condition. In this embodiment, the first and second principal surfaces 11a, 11b are formed in a flat surface.

An island layer 12 is provided on the second principal surface 11b. This island layer 12 constitutes the anti-glare layer 10a. The island layer 12 is a layer provided in islands. The provision of the island layer 12 covering part of the second principal surface 11b in this manner results in the formation of a concavo-convex configuration. The concavo-convex configuration is preferably free from regularity. The reason for this is that the anti-glare function of the anti-glare layer 10a increases.

No particular limitation is placed on the constituent material for the island layer 12 so long as it has light permeability and can adhere to the base material body 11. The island layer 12 can be made of, for example, $SiO_2$, $TiO_2$, $Al_2O_3$. $ZrO_2$ or so on.

An antireflection layer 20 is provided on the anti-glare layer 10a. Therefore, the antireflection layer 20 is provided on the concavo-convex configuration.

The antireflection layer 20 is a layer having the function of reducing the surface reflectance. The antireflection layer 20 need only be a layer giving a lower surface reflectance when provided than when not provided and may not necessarily be a layer reducing the surface reflectance to zero.

The antireflection layer 20 may be formed of, for example, a low-refractive index layer having a lower refractive index than the base material 10. Alternatively, the antireflection layer 20 may be formed of a dielectric multi-layer film in which low-refractive index layers having a relatively low refractive index and high-refractive index layers having a relatively high refractive index are alternately deposited.

The anti-reflection function of an antireflection layer significantly depends on the thickness of the antireflection layer. For this reason, the anti-reflection function is generally provided on a flat surface. Therefore, it is conventionally considered that, for example, in providing both an anti-glare layer and an antireflection layer, the antireflection layer needs to be first formed on a flat surface of a base material and the anti-glare layer needs to be then formed on the antireflection layer.

However, the inventors conducted intensive studies and found that by providing the antireflection layer 20 on the anti-glare layer 10a having a concavo-convex configuration, the visibility of the display could be further improved. In other words, the inventors found that even if the antireflection layer 20 was disposed on the anti-glare layer 10a, a sufficient anti-reflection function could be attained.

The anti-glare/antireflection member 1 can achieve excellent anti-glare properties since it is provided with the anti-glare layer 10a. Furthermore, since the antireflection layer 20 is disposed on the anti-glare layer 10a, the reflectance at the anti-glare layer 10a is reduced. Thus, the amount of light diffusely reflected by the anti-glare layer 10a can be reduced. Therefore, more excellent anti-glare properties can be achieved.

In addition, since the antireflection layer 20 is provided on the outermost layer toward the observer, the reflection of the background can be reduced.

As just described, the use of the anti-glare/antireflection member 1 can provide excellent anti-glare properties while reducing the reflection of the background. Therefore, with the use of the anti-glare/antireflection member 1, the visibility of the display can be increased.

Figure 2:
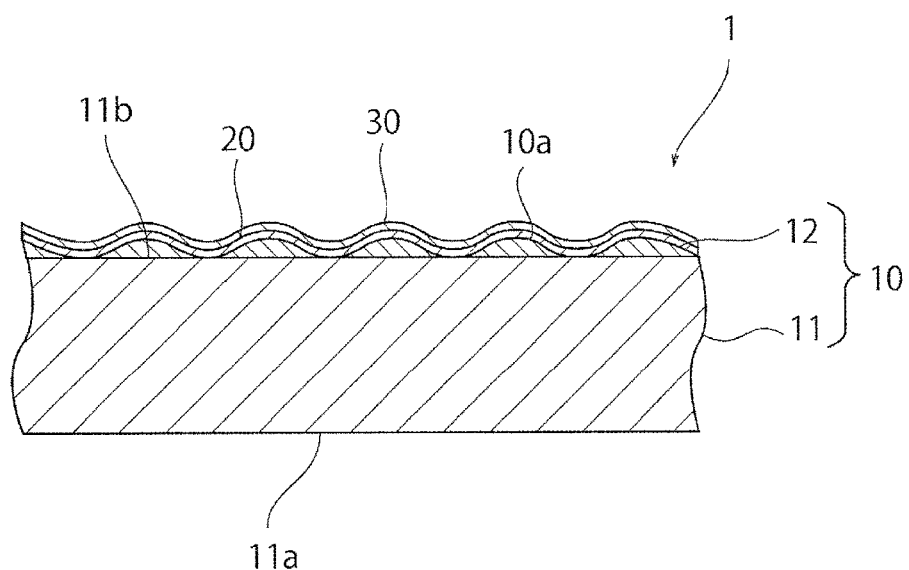
FIG. 2 is a schematic cross-sectional view of an anti-glare/antireflection member according to another embodiment of the present invention.

An additional layer having a thickness not impairing the function of the antireflection layer 20 may be formed on the antireflection layer 20. For example, as shown in FIG. 2, an antifouling layer 30 of 200 nm or less thickness containing fluorine may be formed on the antireflection layer 20. The fluorine-containing antifouling layer 30 may be made of, for example, a polymer having —Si—O—Si— bonds (siloxane bonds) and fluorine-containing, water-repellent functional groups. In the fluorine-containing antifouling layer, the siloxane bonds are synthesized by dehydrocondensation of dimeric silanol.

In the anti-glare/antireflection member 1, a pressure-sensitive adhesive layer or an adhesive layer may be provided on the first principal surface 11a. Thus, the anti-glare/antireflection member 1 can be pressure-sensitively attached or glued via the pressure-sensitive adhesive layer or the adhesive layer to the screen of a display, such as a liquid crystal display.

The anti-glare/antireflection member 1 can be produced, for example, in the following manner. First, a light-transmissive material is applied, by spraying, on a base material body 11 which is a light-transmissive plate made of, for example, glass or resin and then dried to form an island layer 12 thereon, thus preparing a base material 10. Thereafter, an antireflection layer 20 is formed on the island layer 12 of the base material 10, so that an anti-glare/antireflection member 1 can be produced. The antireflection layer 20 can be formed by, for example, sputtering, CVD (chemical vapor deposition) or so on.

Alternatively, the base material 10 can be prepared, for example, by blasting a surface of the light-transmissive plate to form a concavo-convex configuration. In this case, the surface is preferably etched after being blasted. For example, if the base material is formed of a thin glass plate or a glass film, the base material may be damaged by blasting and, therefore, the anti-glare layer 10a is preferably formed by spraying.

The present invention will be described below in more detail with reference to specific examples but the present invention is not at all limited by the following examples. Modification and variations may be appropriately made therein without changing the gist of the present invention.

Example 1

An anti-glare layer made of $SiO_2$ and having a concavo-convex configuration was formed, by spraying, on a substrate of alkali-free glass OA-10G manufactured by Nippon Electric Glass Co., Ltd. with a thickness of 0.5 mm and a surface roughness (Ra) of approximately 0.2 nm. The average thickness of the anti-glare layer was approximately 500 nm. The haze value of the anti-glare layer was approximately 12.

Next, $SiO_2$ layers and $Nb_2O_5$ layers were alternately formed, by sputtering, on the anti-glare layer to give a total of five layers. Thus, an antireflection layer composed of alternately deposited $SiO_2$ and $Nb_2O_5$ layers was provided on the anti-glare layer. In the above manner, an anti-glare/antireflection member was produced.

The resultant anti-glare/antireflection member was evaluated in terms of the reflection of the surroundings and contrast in the following manners. The evaluation results are shown in Table 1.

In terms of the reflection of the surroundings, the anti-glare/antireflection member was visually checked at 60° to the perpendicular. If the reflection of the surroundings was not substantially identified, this was evaluated as " ⊚ ". If the reflection of the surroundings was identified a little, this was evaluated as a "○". If the reflection of the surroundings was identified, this was evaluated as a "Δ". If the reflection of the surroundings was clearly identified, this was evaluated as a "x".

The evaluation for contrast was carried out by placing the anti-glare/antireflection member on a liquid crystal screen and observing an image on the liquid crystal screen through the anti-glare/antireflection member. Specifically, if the image was seen more clearly than when observing it directly on the liquid crystal screen, this was evaluated as a " ⊚ ". If the image was seen as clearly as when observing it directly on the liquid crystal screen, this was evaluated as a "○". If the image was seen more blurred than when observing it directly on the liquid crystal screen, this was evaluated as a "x".

Comparative Example 1

Only an anti-glare layer was formed on a substrate in the same manner as in Example 1 but no antireflection layer was provided. The resultant member was evaluated in terms of the reflection of the surroundings and contrast in the same manner as in Example 1. The evaluation results are shown in Table 1.

Comparative Example 2

Only an antireflection layer was formed on a substrate in the same manner as in Example 1 but no anti-glare layer was provided. The resultant member was evaluated in terms of the reflection of the surroundings and contrast in the same manner as in Example 1. The evaluation results are shown in Table 1.

TABLE 1

|  | Ex. 1 | Comp. Ex. 1 | Comp. Ex. 2 |
| --- | --- | --- | --- |
| Contrast | ○ | X | ⊚ |
| Reflection | ⊚ | ○ | Δ |

As is obvious from the results shown in Table 1, Example 1 was substantially free from reflection of the surroundings and had good contrast. In Comparative Example 1, the reflection of the surroundings was identified a little but the contrast significantly decreased. Comparative Example 2 had good contrast but was insufficient to prevent the reflection of the surroundings.

Example 2

An anti-glare layer made of $SiO_2$ and having a concavo-convex configuration was formed, by spraying, on a glass substrate with a thickness of 0.7 mm, a surface roughness (Ra) of approximately 0.2 nm, and a coefficient of thermal expansion of $102 \times 10^{-7}$/° C. The average thickness of the anti-glare layer was approximately 200 nm. The haze value of the anti-glare layer was approximately 6.5.

Next, $SiO_2$ layers and $Nb_2O_5$ layers were alternately formed, by sputtering, on each of the anti-glare layer and a surface of the substrate opposite to the anti-glare layer to give a total of five layers on each surface. Thus, an antireflection layer composed of alternately deposited $SiO_2$ and $Nb_2O_5$ layers was provided on the anti-glare layer. In the above manner, an anti-glare/antireflection member was produced.

The resultant anti-glare/antireflection member was evaluated in terms of the reflection of the surroundings and contrast. The evaluation for the reflection of the surroundings was carried out in the same manner as in Example 1. The evaluation for contrast was carried out in the same manner as in Example 1, except for placing the anti-glare/antireflection member above a liquid crystal screen with a gap of 2.5 mm from the screen. As a result, also in Example 2, like Example 1, the reflection of the surroundings was not substantially identified (" ⊚ ") and the image on the liquid crystal screen was seen as clearly as when observing it directly thereon ("○").

The coefficient of thermal expansion of the anti-glare/antireflection member is not always equal to that of the liquid crystal screen. If the anti-glare/antireflection member and the liquid crystal screen having different coefficients of thermal expansion are in close contact with each other, stress is applied to both the anti-glare/antireflection member and the liquid crystal screen when the temperature changes. Therefore, it is preferred in some cases to place the anti-glare/antireflection member and the liquid crystal screen at a distance from each other. However, when a gap is provided between the anti-glare/antireflection member and the liquid crystal screen, the contrast normally tends to decrease. Unlike this, when as in Example 2 an antireflection layer is provided on an anti-glare layer and another antireflection layer is provided on the surface of a substrate opposite to the anti-glare layer, good contrast was achieved even in the presence of a gap between the anti-glare/antireflection member and the liquid crystal screen. From the viewpoint of achieving good contrast, it is preferred to, as in Example 2, provide an antireflection layer on an anti-glare layer and provide another antireflection layer also on the surface of a substrate opposite to the anti-glare layer.

Example 3

An antifouling layer was provided in the following manner on an antireflection layer of an anti-glare/antireflection member obtained in the same manner as in Example 1.

A fluorine-based coating agent (OPTOOL DSX (registered trademark) manufactured by Daikin Industries, Ltd.) was applied on the antireflection layer and then dried to form an antifouling layer. The thickness of the antifouling layer was approximately 20 nm.

The resultant anti-glare/antireflection member includes the anti-glare layer formed on the substrate, the antireflection layer formed on the anti-glare layer, and the antifouling layer formed on the antireflection layer.

The resultant anti-glare/antireflection member was evaluated in terms of the reflection of the surroundings and contrast. The evaluation for the reflection of the surroundings was carried out in the same manner as in Example 1. The evaluation for contrast was carried out in the same manner as in Example 1, except for applying an adhesive layer on the first principal surface and gluing the anti-glare/antireflection member to the liquid crystal screen via the adhesive layer. The adhesive used was KE-1051J A/B manufactured by Shin-Etsu Chemical Co., Ltd. and the thickness of the adhesive layer was 5 μm. As a result, also in Example 3, like Examples 1 and 2, the reflection of the surroundings was not substantially identified ("⊚") and the image on the liquid crystal screen was seen as clearly as when observing it directly thereon ("○").

In addition, the peel resistance of the antifouling layer was evaluated in the following manner.

The evaluation for the peel resistance of the antifouling layer was carried out by placing steel wool #0000 on the antifouling layer, moving the steel wool back and forth 2000 times at a rate of 40 times per minute with a stroke length of 40 mm under a load of 500 gf/cm², and then measuring the contact angle between the antifouling layer and water droplets. The contact angle was measured in accordance with the ATAN θ/2 method based on Young's Equation. Specifically, if the contact angle after the back-and-forth movement of the steel wool was at the same level as that before the placement of the steel wool, this was evaluated as a "○". If the contact angle after the back-and-forth movement of the steel wool significantly decreased from that before the placement of the steel wool, this was evaluated as a "x".

As a result, the contact angle after the back-and-forth movement of the steel wool was at the same level as that before the placement of the steel wool ("○").

Comparative Example 3

The member of Comparative Example 2 was used instead of the anti-glare/antireflection member of Example 1 and an antifouling layer was formed on the antireflection layer of the member in the same manner as in Example 3. The resultant member was evaluated in terms of the reflection of the surroundings and contrast in the same manner as in Example 3.

As a result, like Comparative Example 2, Comparative Example 3 had good contrast ("⊚") but was insufficient to prevent the reflection of the surroundings ("Δ").

In addition, the peel resistance of the antifouling layer was evaluated in the same manner as in Example 3. As a result, the contact angle after the back-and-forth movement of the steel wool significantly decreased from that before the placement of the steel wool ("x").

Example 4

An anti-glare layer made of SiO₂ and having a concavo-convex configuration was formed, by spraying, on a substrate of alkali-free glass OA-10G manufactured by Nippon Electric Glass Co., Ltd. with a thickness of 0.1 mm and a surface roughness (Ra) of approximately 0.2 nm. The average thickness of the anti-glare layer was approximately 60 nm. The haze value of the anti-glare layer was approximately 3.

Next, an antireflection layer was provided on the anti-glare layer in the same manner as in Example 1.

Furthermore, an antifouling layer was formed on the antireflection layer in the same manner as in Example 3.

The resultant anti-glare/antireflection member was evaluated in terms of the reflection of the surroundings and contrast. The evaluation for the reflection of the surroundings was carried out in the same manner as in Example 1. The evaluation for contrast was carried out in the same manner as in Example 1, except for providing a pressure-sensitive adhesive layer on the first principal surface of the anti-glare/antireflection member and pressure-sensitively attaching the anti-glare/antireflection member to a touch panel-equipped display via the pressure-sensitive adhesive layer. The pressure-sensitive adhesive used was PD-S1 manufactured by PANAC Co., Ltd. and the thickness of the pressure-sensitive adhesive layer was 25 μm. As a result, the reflection of the surroundings was identified a little ("○"). In terms of contrast, the image was seen more clearly than when observing it directly on the touch panel-equipped display ("⊚").

In addition, the peel resistance of the antifouling layer was evaluated in the same manner as in Example 3. As a result, the contact angle after the back-and-forth movement of the steel wool was at the same level as that before the placement of the steel wool ("○").

REFERENCE SIGNS LIST

1 . . . anti-glare/antireflection member
10 . . . base material
10a . . . anti-glare layer
11 . . . base material body
11a . . . first principal surface
11b . . . second principal surface
12 . . . island layer
20 . . . antireflection layer
30 . . . antifouling layer

The invention claimed is:

1. An anti-glare/antireflection member comprising:
   a base material provided in a surface layer thereof with an anti-glare layer having a concavo-convex configuration; and
   an antireflection layer provided on the anti-glare layer;
   wherein the base material comprises:
   a base material body having first and second principal surfaces opposed to each other; and
   an island layer including a plurality of islands provided on the second principal surface and forming the anti-glare layer; and
   wherein the island layer covers part of the second principal surface so that the antireflection layer is in direct contact with both of the islands of the island layer and the portions of the second principal surface.

2. The anti-glare/antireflection member according to claim 1, wherein the base material body is formed of a resin film, a glass film, a resin plate or a glass plate.

3. The anti-glare/antireflection member according to claim 2, wherein the glass plate is made of an alkali-free glass substrate, a soda-lime glass substrate, or a chemically tempered glass substrate.

4. The anti-glare/antireflection member according to claim 1, further comprising another antireflection layer provided on the first principal surface.

5. The anti-glare/antireflection member according to claim 1, wherein the antireflection layer is formed of a low-refractive index layer having a lower refractive index than the base material.

6. The anti-glare/antireflection member according to claim 1, wherein the antireflection layer is formed of a structure in which low-refractive index layers having a relatively low refractive index and high-refractive index layers having a relatively high refractive index are alternately deposited.

7. The anti-glare/antireflection member according to claim 1, further comprising an antifouling layer containing fluorine and provided on the antireflection layer.

8. The anti-glare/antireflection member according to claim 1, wherein the island layer is made of at least one of SiO₂, TiO₂, Al₂O₃, and ZrO₂.

9. The anti-glare/antireflection member according to claim 1, wherein the base material is composed of an inorganic material.

10. The anti-glare/antireflection member according to claim 1, further comprising a pressure-sensitive adhesive layer or an adhesive layer provided on the first principal surface.

11. A method for producing the anti-glare/antireflection member according to claim 1, wherein a light-transmissive material is applied on a surface of a light-transmissive plate by spraying to form an island layer thereon, thus preparing the base material composed of the light-transmissive plate and the island layer.

12. The method for producing the anti-glare/antireflection member according to claim 11, wherein the antireflection layer is formed by sputtering.

13. A method for producing the anti-glare/antireflection member according to claim 1, wherein a surface of a light-transmissive plate is blasted to form the concavo-convex configuration, thus preparing the base material.

14. The method for producing the anti-glare/antireflection member according to claim 13, wherein the surface of the light-transmissive plate is etched after being blasted.

15. The method for producing the anti-glare/antireflection member according to claim 13, wherein the antireflection layer is formed by sputtering.

\* \* \* \* \*